United States Patent [19]

Schuyler, Jr.

[11] Patent Number: 4,671,006
[45] Date of Patent: Jun. 9, 1987

[54] KEEL AND METHOD FOR MAKING A KEEL FOR A PLUG TYPE FISHING LURE

[76] Inventor: Keith C. Schuyler, Jr., R.D. #1, Box 197, Muncy, Pa. 17756

[21] Appl. No.: 872,033

[22] Filed: Jun. 9, 1986

[51] Int. Cl.⁴ .............................................. A01K 85/00
[52] U.S. Cl. ................................ 43/42.48; 43/42.47; 43/42.53
[58] Field of Search ................ 43/42.22, 42.45, 42.47, 43/42.48, 42.53, 43.13

[56] References Cited

U.S. PATENT DOCUMENTS

| | | | |
|---|---|---|---|
| 3,122,852 | 3/1964 | Bocchino | 43/42.47 |
| 3,363,359 | 1/1968 | Oney | 43/42.47 |
| 3,367,057 | 2/1968 | Pond | 43/42.47 |
| 4,445,294 | 5/1984 | Gowing | 43/42.47 |

Primary Examiner—M. Jordan
Attorney, Agent, or Firm—Ruth Moyerman

[57] ABSTRACT

A fishing lure and a method of improving a fishing lure of the plug type uses a keel to impart stability to the lure. The keel is attached to either the lure bottom or to a lip bottom. By providing critical angles of keel drop and approach angle to the lure's center line, the keel stabilizes the lure and controls the action of the lure as it is pulled through the water, thereby effectively broadening the usable lure speed range without necessitating additional weight to maintain the desired depth of lure passage through the water.

9 Claims, 3 Drawing Figures 4,671,006

KEEL AND METHOD FOR MAKING A KEEL FOR A PLUG TYPE FISHING LURE

BACKGROUND OF THE INVENTION

1. Field of the Invention

This invention relates to fishing, and more particularly to artificial bait.

2. Description of the Prior Art

The field of fishing reels, rods, and lures is replete with many devices to make the art of fishing more exact and more enjoyable. As is well known in the art, there are many plug type fishing lures made of wood, plastic, or other materials which give the lure body a shape that resembles an object the fish might strike.

In order to attract larger fish, lures are made larger. However, as lures get larger, certain hydrodynamic problems arise. In attempting to solve those problems, and in order to give action (a back and forth wiggle) to the lure, some lures have lips jutting out from their front ends. These lures may have a natural back and forth motion and a natural roll with each wiggle, but they are often unstable, losing the desired action above and/or below desired lure velocities as they are pulled through the water. As such lures are pulled through the water, they sometimes become unstable and return to the surface of the water. Presently, the only recourse for this problem is added weight to the fishing line.

There is, therefore, a need for an improved fishing lure type which will impart stabilty to larger lures across a broad range of speeds without adding excess weight, which will have controlled action, and which will be adaptable to plug type fishing lures, both sectional or unitary.

SUMMARY OF THE INVENTION

The aforementioned prior art problems are obviated by this invention in which a blade-shaped keel is added to the bottom of a preferably plug type fishing lure. In order to stabilize the lure, the keel must meet certain critical dimensions. An imaginary center line is drawn lengthwise through the lure from the point of line attachment on the lure front to the terminal resistance point on the lure tail. Terminal resistance, in the preferred embodiment, is determined by the rear most object flexing aft and creating drag on the lure body, for example, to terminal treble hook burr.

The keel is shaped and positioned so that an imaginary line (keel drop line) drawn along the keel bottom edge to the center line forms an angle of from about 5° to about 7°. An imaginary line drawn along the keel top to meet the center line forms an approach angle of from about 16° to about 22°. When the keel is attached to a lure with a lip, the lip top is used to determine the approach angle.

It is, therefore, an object of this invention to provide a method of improving a plug type fishing lure by adding a keel to the lure bottom.

It is another object of this invention to provide a method of improving plug type fishing lures such as those with lips or other action imparting additions, as well as those without lips.

It is a further object of this invention to provide an improved plug type fishing lure which embodies the critical angles necessary for a keel to impart stability to a fishing lure.

It is still another object of this invention to provide the keel of this invention as a part of a plug type fishing lure with a lip onto which the keel is fastened.

It is yet another object of this invention to provide an improvement for a fishing lure which can be adapted for use with any size fishing lure, and particularly for larger lures in excess of eight inches in length.

It is a further object of this invention to provide an improvement to a plug type fishing lure with a lip or other action producing addition, which will control the action of the lure.

It is still a further object of this invention to provide an improvement to a plug type fishing lure which controls a floating lure's buoyancy as it is pulled through the water.

It is yet a further object of this invention to provide an improvement to a plug type fishing lure of the segmented type, the keel of the invention being installed on or part of the forward segment.

These and other objects will be more readily ascertainable to one skilled in the art from a consideration of the following Figures, description and exemplary embodiments.

BRIEF DESCRIPTION OF THE DRAWING(S)

DETAILED DESCRIPTION OF THE PREFERRED EMBODIMENT(S)

Figure 1:
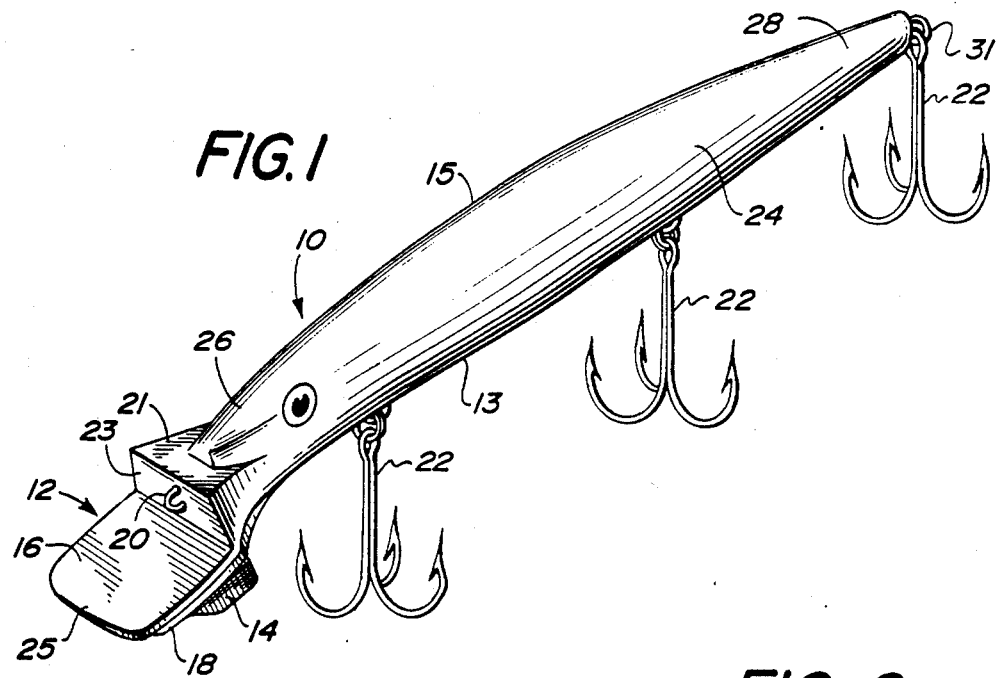
FIG. 1 is an isometric view of a plug type fishing lure utilizing the keel of this invention.

Now referring to the Drawings, and more particularly to FIG. 1, a plug type fishing lure, generally 10, is shown with keel 14 attached to underside 18 of lip 12. In all embodiments illustrated herein, plug type fishing lure 10 is equipped with lip 12. It should be understood that, although having lip 12 or other similar action imparting extension on lure 10 is helpful for the desired action the lip gives to the lure, the keel of this invention gives stability to any plug type fishing lure, including those without lips. It should also be understood that, although the keel is preferably placed on the lure front, the keel may be placed further back on the plug body. However, such placement may interfere with the fish striking the lure effectively. Also, although a two-step platform type lip is shown in all views, any lip with a relatively flat top and bottom would work well with the keel of this invention.

Lure 10 is shown having body 24, top 15, underside 13, front end 26, tail end 28, and hooks 22. Line eye attachment 20, which is the means for attaching a line, is seen on lip 12. If there is no lip on lure 10, an eye attachment preferably would be proximate the center of front end 26. Hooks 22 are attached to underside 13 and to tail end 28 at the terminal resistance point 31.

Lip 12 is shown to have two sections, lip extension 21 and lower lip 25 separated by riser 23. Line eye attachment 20 is found on riser 23. Lower lip 25 has flat upper surface 16 and flat underside 18 onto which keel 14 is attached. In the preferred embodiment, keel 14, lip 12 and lure 10 are all molded as one unit. It is possible, however, to have lip 12 and keel 14 molded as one unit which is then attached to lure 10, or to have all elements separate.

Figure 2:
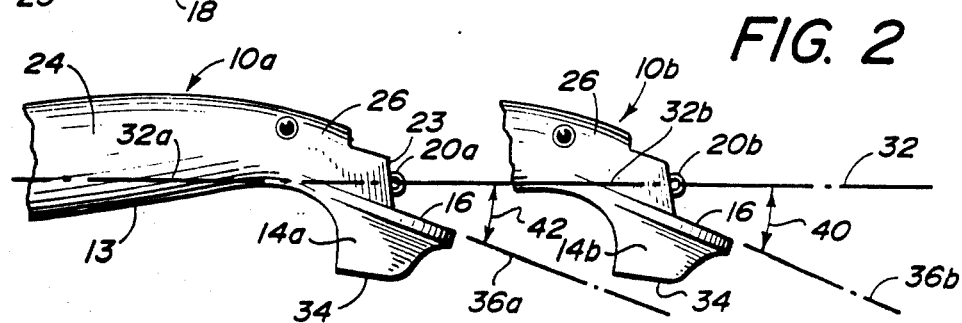
FIG. 2 is a fragmentary side view of two fishing lure examples fitted with lips and including the keel of this invention to illustrate the approach angles which I discovered as critical to having the invention perform satisfactorily.

Now referring to FIG. 2, fragmentary side views of two fishing lures, examples 10a and 10b, illustrates the approach angles necessary to having the invention perform satisfactorily. Lures 10a and 10b are shown having bodies 24, front ends 26, risers 23 and upper surfaces 16. Undersides 18 of lower lips 25 cannot be seen because keels 14 with bottom blade edges 34 are attached to lower lips 25. Line attachment is at line eyes 20 on risers 23.

Center lines 32a and 32b have been drawn lengthwise through each body 24 from the point of line attachment (20a and 20b) to the point of terminal resistance 31 (as seen in FIG. 1). Approach lines 36a and 36b have been drawn along upper surface 16 of lower lip 25. When lines 32a and 32b meet lines 36a or 36b, they form approach angles 42 and 40, respectively. Angle 42 is approximately 19° and angle 40 is approximately 21.5°. By testing, I have found that the approach angle must be between 16° and 22° in order for the lure to perform satisfactorily; that is, for the lip to give action and the keel to impart the stability necessary to control the action at various speeds. Blade approach angles less than 16° produce lures with no action and approach angles in excess of 22° prevent the keel from exerting its control over the lure's action and stability.

Blade approach lines 36a and 36b have been drawn along upper surface 16 of lip 12. If keel 14 is attached to another part of the lure (such as back further along bottom 13 of lure 10) the approach line would still be drawn along the lip top surface. In a lure without a lip, action is not imparted through a lip structure, and an approach line would have no significance.

Figure 3:
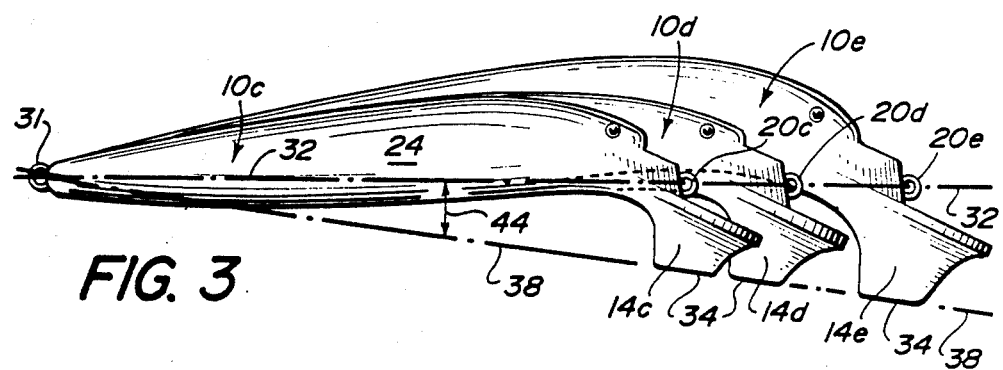
FIG. 3 is a schematic view of lures of different sizes with the keel of this invention, showing the formula for bottom keel angle and its relationship to each lure's center line.

Now referring to FIG. 3, a schematic view shows lures 10c, 10d, and 10e, all of different sizes, all using a keel drop line 38 which forms a keel drop angle 44 of about 6° with center line 32. Lures 10c, 10d and 10e have terminal point of resistance 31, and line eye attachments 20c, 20d and 20e, respectively. Imaginary center line 32 is drawn between those two points. Each lure 10 has a keel 14 with bottom blade edge 34 from which keel drop line 38 has been drawn to meet center line 32 at the terminal point of resistance 31. Although lures 10c, 10d and 10e are of different sizes and keels 14c, 14d and 14e are of different sizes and have slightly different approach angles (as can easily be seen in this Figure and as pictured in FIG. 2), each keel is shaped so that angle 44 is always about 6°.

As seen in FIG. 3, the lips can be of different widths, lengths, thicknesses and shapes. Moving line eye attachment 20 up on the lure front changes the center line and requires that the keel be shortened to conform with achievement of a 6° angle. Conversely, locating line eye attachment 20 lower on the lure also changes the center line and requires a longer keel 14.

Although angle 44 is preferred to be 6°, it may vary slightly. For example, a 5.5° keel drop angle will allow the lure more side-to-side roll, while a 6.5° keel drop angle will reduce this rolling action and restrict the amount of side-to-side "wiggle." However, when either of these limits is exceeded, the longer keel will reduce lure action, while the shorter keeled lure will become unstable at faster lure speeds. Thus, for the desired result of good action, control and lure stability, it is preferred that the keel drop angle 44 approximate 6° and that the approach angle be between 16° and 22°.

There are variations which can be practiced within the scope of this invention. First, the lure may be equipped with a lip of the design illustrated or with a lip of another design. As long as the approach angle remains approximately 16° to 22°, the lure will have the desired controlled action.

Second, the keel may be added to the lure body instead of the lip.

Third, it is possible to use the keel without a lip, although the lip is preferred.

Also, it is preferred that the keel, lip and lure be unitary, but it is entirely within the scope of this invention to fasten the keel separately to a lure or lip.

There are several advantages to the improved fishing lure of this invention. Chiefly, by adding a keel to a large lure with a lip, the lure gains a greater degree of stability which it would not have due to increased water resistance.

Second, the keel helps to control a floating lure's buoyancy under the water, regardless of the size of the lure.

Lastly, by adding a keel to a lure with a lip, the keel controls the action imparted by the lip.

Having now illustrated and described my invention, it is not intended that such description limit this invention, but rather that this invention be limited only by reasonable interpretation of the appended claims.

What is claimed is:

1. In a plug type fishing lure, said lure having a top and an underside, a tail end on which is located the terminal resistance point, and a front end including line attachment means, the improvement comprising a downwardly projecting blade shaped keel, said keel attached to said lure's underside and running lengthwise from front to back, said keel having a top attached to said lure and a generaly blade-shaped bottom edge, said bottom edge diagonally dispersed in relation to said lure underside so that an imaginary line drawn along said keel top to an imaginary center line drawn lengthwise through said lure from said point of line attachment to said terminal resistance point forms an angle of about 16° to about 22°, said keel shaped so that an imaginary line drawn along said keel bottom edge to said center line forms an angle of about 5° to about 7° with said center line, whereby said keel imparts stability to said lure as said lure is pulled through the water.

2. The improvement to a fishing lure according to claim 1 wherein said lure and said keel are unitary.

3. In a plug type fishing lure, said lure having a top and an underside, a tail end on which is located the terminal resistance point, and a front end including means for line attachment, said lure also including a lip jutting outward and downward from said front end, said lip having a generally flat top and underside, said lip disposed on said lure front so that an imaginary line drawn along said lip top to an imaginary center line drawn lengthwise through said lure from said point of line attachment to said terminal resistance point forms an approach angle of from about 16° to about 22°, the improvement comprising a downwardly projecting blade-shaped keel, said keel attached to said the underside of said lip and running lengthwise from front to back along said lip, said keel having a tip attached to said lip underside, said keel shaped so that an imaginary line drawn along said keel bottom edge to said center line forms an angle of from about 5° to about 7°, whereby said keel imparts stability to said lure and controls the action of said lure as said lure is pulled through the water.

4. The improvement to a fishing lure according to claim 3 wherein said lure and said keel are unitary.

5. A method of imparting stability to a plug type fishing lure, said lure having a front and a tail end on which is located the terminal resistance point, a bottom and a top, and point means proximate said front end to attach a line, said method comprising:

(a) determining an imaginary center line on said lure, said center line being a line running lengthwise through said lure from said lure's point of line attachment to said lure's terminal resistance point on said lure tail end;

(b) determining an imaginary approach line, said approach line being a line drawn from said center line downward to below said lure's bottom, said approach line forming an approach angle from about 16° to about 22° with said center line;

(c) determining an imaginary keel drop line, said keel drop line being a line drawn from said terminal resistance point to below said lure's bottom to form an angle from about 5° to about 7° with said center line;

(d) forming a blade-shaped keel which, when fastened to said lure, has a top axis defined by said approach line and a bottom edge axis defined by said keel drop line; and, (e) attaching said keel to said lure on said lure's bottom proximate said lure's front, as described in step (d).

6. The method of imparting stability to a plug type fishing lure according to claim 5 wherein said lure and said keel are unitary.

7. A method of imparting stability to, and controlling the action of, a plug type fishing lure, said lure being elongated and having a top and a bottom, a tail end on which is located the terminal resistance point, and a front end, said front end including a lip and means for line attachment, said method comprising:

(a) determining an imaginary center line on said lure, said center line being a line running lengthwise through said lure from said lure's point of line attachment to said lure's terminal resistance point;

(b) determining an imaginary approach line, said approach line being a line drawn from said center line to below said lure's bottom to form an approach angle from about 16° to about 22° with said center line;

(c) determining an imaginary keel drop line, said keel drop line being a line drawn from said terminal resistance point to below said lure's bottom to form an angle from about 5° to about 7° with said center line;

(d) forming a blade-shaped keel which, when attached to said lure, has a top axis defined by said approach line and a bottom edge axis defined by said keel drop line; and (e) attaching said keel to said lure's bottom proximate said lure front end.

8. The method of imparting stability to a plug type fishing lure according to claim 7 wherein said keel is attached to the underside of said lip and wherein said approach line is drawn along said lip's upper surface.

9. The method of imparting stability to a plug type fishing lure according to claim 7 wherein said lure, lip, and keel are unitary.

* * * * *